(12) United States Patent
Wang

(10) Patent No.: US 7,442,364 B1
(45) Date of Patent: *Oct. 28, 2008

(54) PLASMA-INDUCED HYDROGEN PRODUCTION FROM WATER

(76) Inventor: Chi S. Wang, 5923 Fairmount Dr., Woodridge, IL (US) 60517

( * ) Notice: Subject to any disclaimer, the term of this patent is extended or adjusted under 35 U.S.C. 154(b) by 431 days.

This patent is subject to a terminal disclaimer.

(21) Appl. No.: 11/280,384

(22) Filed: Nov. 16, 2005

(51) Int. Cl.
C01B 3/24 (2006.01)
(52) U.S. Cl. ........................ 423/650; 423/652
(58) Field of Classification Search .......... 423/652, 423/650
See application file for complete search history.

(56) References Cited

U.S. PATENT DOCUMENTS

| | | | |
|---|---|---|---|
| 5,211,923 A | 5/1993 | Harkness et al. | |
| 5,409,784 A | 4/1995 | Bromberg et al. | |
| 5,614,156 A | 3/1997 | Wang | |
| 5,746,985 A | 5/1998 | Takashashi | |
| 5,843,395 A | 12/1998 | Wang | |
| 5,887,554 A | 3/1999 | Cohn et al. | |
| 5,929,286 A | 7/1999 | Krumpelt et al. | |
| 5,939,025 A | 8/1999 | Ahmed et al. | |
| 6,221,117 B1 | 4/2001 | Edlund et al. | |
| 6,245,309 B1 | 6/2001 | Etievant et al. | |
| 6,348,278 B1 | 2/2002 | LaPierre et al. | |
| 6,372,156 B1 * | 4/2002 | Kong et al. | 252/373 |
| 6,458,478 B1 | 10/2002 | Wang et al. | |
| 6,572,837 B1 * | 6/2003 | Holland et al. | 423/648.1 |
| 6,936,364 B2 | 8/2005 | Reinke et al. | |
| 2002/0114747 A1 * | 8/2002 | Marchand et al. | 422/198 |
| 2002/0146359 A1 * | 10/2002 | Lomax et al. | 422/198 |
| 2004/0063577 A1 * | 4/2004 | Wieland et al. | 502/339 |
| 2004/0091418 A1 * | 5/2004 | Carlow et al. | 423/650 |

OTHER PUBLICATIONS

U.S. Department of Energy, Hydrogen Production and Delivery Research, Solicitation No. DE-PS36-03GO93007, Jul. 24, 2003, pp. 2, c-7.
Spindt, C.A., A Thin-Film Field-Emission Cathode, J. Of Applied Physics, 39, 1968, pp. 3504-3505, no month.
Lias, Sharon G., Ionization Energies of Gas-Phase Molecules, CRC Handbook of Chemistry & Physics, 83$^{rd}$ Ed. 2002-2003, pp. 10-181 to 10-198, no month.

* cited by examiner

Primary Examiner—Wayne Langel
(74) Attorney, Agent, or Firm—Philip H Kier

(57) ABSTRACT

A process for producing hydrogen for direct use as a fuel or for input to a fuel cell from dissociating $H_2O$ in a plasma reformer with hydrocarbon fuel acting as an initiator. The molar ratio of water to hydrocarbon fuel in the input mixture for reactions, and therefore the production of hydrogen from water, increases with the carbon number of the hydrocarbon fuel. Steps in the process include: mixing and vaporizing an $H_2O$ and hydrocarbon fuel mixture in an atomization/evaporation chamber, further heating the mixture in a rotating-flow buffer chamber, dissociating $H_2O$ and hydrocarbon fuel in a plasma reformer, converting carbon monoxide and $H_2O$ to hydrogen and carbon dioxide in a water shift reactor and optionally conditioning the reformate stream by removing carbon dioxide and by purifying hydrogen.

12 Claims, 10 Drawing Sheets

PLASMA-INDUCED HYDROGEN PRODUCTION FROM WATER

BACKGROUND OF THE INVENTION

This invention pertains to dissociating $H_2O$ into hydrogen and oxygen. More particularly it pertains to splitting $H_2O$ into hydrogen and oxygen in a process wherein a hydrocarbon fuel acts as an initiator and the dissociation takes place under non-equilibrium thermal plasma conditions after the fuel and $H_2O$ are uniformly mixed and heated using rotating flow.

Hydrogen powered fuel cells have long been recognized as having great potential for stationary power generation and for transportation applications. Advantages of fuel cells include their ability to generate power more efficiently than internal combustion engines and other conventional power sources while producing essentially no pollutants. However, currently, no scalable, cost-effective, environmentally attractive hydrogen production process is available for commercialization. Hydrogen can be produced from dissociation of $H_2O$ or from reforming of hydrogen fuels. Dissociation of $H_2O$ is ideal from an environmental perspective because it produces no greenhouse gases; dissociation of $H_2O$ through electrolysis is energy-intensive and prohibitively expensive.

Hydrogen can be produced from hydrocarbon fuels with use of conventional technologies such as steam reforming, partial oxidation, and auto-thermal reforming. However, these technologies tend to require large components and to be not efficient in meeting large demands, a disadvantage for space-limited facilities such as fueling stations. There are also several technical issues such as capability for fast starts, sulfur contamination, and soot or carbon formation. One problem common to conventional reforming is sulfur removal. Conventional reformer technology requires removal of sulfur from liquid fuels, which is usually accomplished with use of catalysts and heavy heaters. Such components usually raise gas poisoning and temperature sensitivity issues. Also in conventional reformer technology, poor fuel dispersion will create uneven fuel distribution and result in carbon/coke formation in fuel-rich zones and hot spots in fuel-lean zones. The U.S. Department of Energy (USDOE) estimates that currently it costs between \$5.00 and \$6.00 to produce a kilogram of hydrogen, and that this cost should be reduced to \$1.50/kg to be competitive with conventional fuels. The USDOE has also set a primary energy efficiency of 75% to be met in the year 2010. The efficiency of conventional technology for producing hydrogen currently ranges between 65% and 80%.

It is difficult to dissociate $H_2O$ because very high temperatures, in excess of 2500° C., are needed. Also, it is difficult to ionize $H_2O$ because it has a higher ionization energy and enthalpy formations of ions (12.6 eV and 976 kJ/mol, respectively) than hydrocarbon fuels of interest. For example, gasoline has an ionization energy of 9.8 eV and an enthalpy formation of ions of 737 kJ/mol. In addition, it is difficult to ionize $H_2O$ using high energy electrons because $H_2O$ is a small molecule that has a small cross section for ionization by high energy (hard) electrons. However, $H_2O$ cross section for ionization is larger for low energy (soft) electrons than for hard electrons. Such an environment can be created in a reactor in which plasma conditions are set up when hydrocarbon fuels and $H_2O$ are heated to temperatures in the range of 700° C. to 1,000° C.

Wang has taught the use of a reactor for the chemical destruction of heavy-molecule volatile organic compounds, semi-volatile organic compounds, or hydrogen sulfide in U.S. Pat. No. 5,614,146. In such a reactor, the energy to produce plasma and maintain high temperatures comes from the fuel and from electric sources. Thermal radiation enhancement and energy trapping techniques are also used to minimize heat loss. Electro-magnetic hydrodynamics (EMHD) flow creates non-equilibrium chemical reaction conditions to minimize recombination and the conversion or reforming rates. Wang and Lyons in U.S. Pat. No. 6,458,478 B1 have taught the use of such a reactor in an integrated system for producing electricity in a fuel cell for stationary or electric-powered vehicle applications.

The reactor taught by Wang above has been improved to make it efficient for dissociating $H_2O$ (see U.S. Pat. No. 7,070,634 B1). Electrons generated at a hot electrode surface flow toward a cold electrode surface. Interaction between electrons and molecules of a steam/hydrocarbon gas flow generates ionization plasma and increases conductivity of the gas flow. Owing to continued fuel/$H_2O$ feeding, thermal expansion and the EMHD forces, the plasma flow is being pushed downstream and forms a plasma volumetric flow swept through the entire reactor volume.

Although it is preferred that the dissociation occur in the type of plasma reformer described above, the use of a plasma reformer to produce hydrogen rich gas is taught is discussed by Cohn, et al. in U.S. Pat. No. 5,887,554 and by Bromberg et al. in U.S. Pat. No. 5,409,784. The use of a plasma reactor with microwave energies for the production of hydrogen from dissociation of hydrogen sulfide is taught by Harkness et al in U.S. Pat. No. 5,211,923. Also, conventional technologies such as steam reformers, partial oxidation reformers and autothermal reformers could be used.

SUMMARY OF THE INVENTION

The present invention is a process for producing hydrogen from an $H_2O$/hydrocarbon fuel mixture in an non-equilibrium thermal plasma environment. A non-combustion pyrolysis process is used to create and maintain this environment. Dissociation of $H_2O$ is induced by ionization in the plasma environment. The present invention in part replaces hydrocarbon fuels, which have costs, with $H_2O$, which is virtually without cost, as a fuel for producing hydrogen. Preliminary cost estimates based on $H_2O$ replacing 50% of the hydrocarbon fuel and a nearly 100% primary energy efficiency indicate that a cost of less than \$2.00/kg of hydrogen can be achieved. This cost can be further reduced through optimization of the system so that the cost target of \$1.50/kg of hydrogen is feasible. Therefore, an object of the invention is to reduce the cost of producing hydrogen to commercially competitive levels while reducing the consumption of hydrocarbon fuels.

In this invention, the first step is for liquid fuel and water to be separately injected into an atomization/evaporation chamber where they are uniformly mixed and simultaneously vaporized by thermal radiation. The resulting vapor and partly vaporized droplets then enter a buffer chamber where further vaporization and uniformity takes place from thermal radiation. The buffer chamber uses rotating flow to provide uniform mixing and heating. The uniform mixing and uniform heating steps in the atomization/evaporation chamber and the buffer chamber used together with computer control provides precise heating, which has important applications in the semiconductor, pharmaceutical metal processing, and food industries. These pretreatment steps help ensure uniform fuel distributions and help prevent uneven fuel distribution that results in carbon/coke formation in fuel-rich zones and hot spots in fuel-lean zones. Carbon and coke formation, and system plugging resulting from carbon and coke formation are also avoided because carbon reacts directly with oxygen from the dissociation of water to form carbon dioxide. Therefore another object of the invention is to avoid carbon and coke formation.

Reforming techniques that use combustion require introduction of air. The introduction of air causes nitrogen dilution, increases product gas volume, causes polluting nitrogen oxides emissions, and causes formation of free oxygen, which compromises hydrogen safety. Therefore, another object of the invention is to eliminate the undesirable consequences of using combustion. The primary energy source for the invention is electricity. This allows for quick starts and provides control for maintaining optimum conditions for hydrogen production. Therefore, another object of the invention is to provide a quick-starting and readily controlled process for producing hydrogen.

BRIEF DESCRIPTION OF THE SEVERAL VIEWS

DETAILED DESCRIPTION OF THE INVENTION

Figure 1:
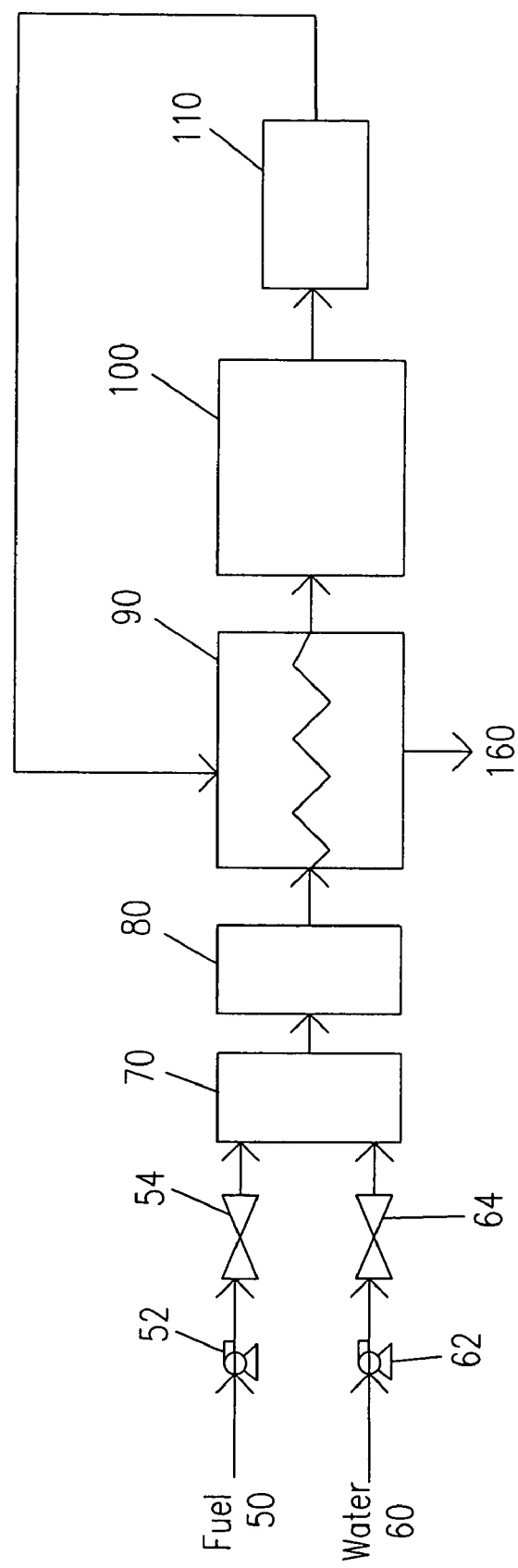
FIG. 1 shows a flow diagram for the process wherein hydrogen is not separated from other constituents of the reformate stream.
Figure 2:
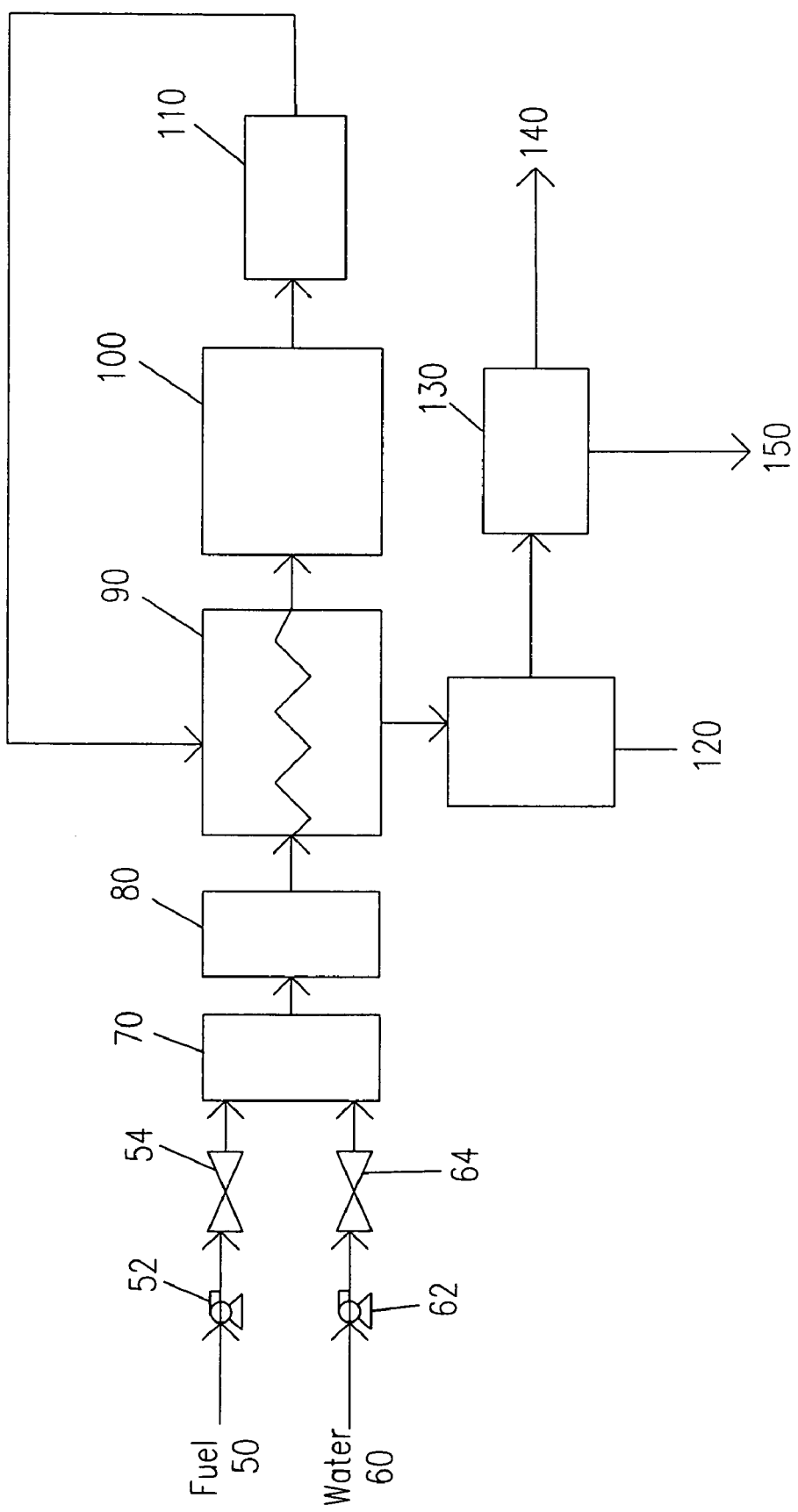
FIG. 2 shows a flow diagram for the process wherein hydrogen is separated from other constituents of the reformate stream.

With reference to FIG. 1 and FIG. 2, liquid or gaseous hydrocarbon fuel from source 50 and water or steam from source 60 enter an injection-atomization chamber 70 after passing through pumps 52 and 62, respectively and control valves 54 and 64, respectively. This injection-atomization chamber has fuel and $H_2O$ injectors or atomizers where liquid fuel and water are mixed, atomized, and vaporized to a uniform mixture. If both the fuel is gaseous and $H_2O$ is in the form of steam, this chamber is still used to mix the two. This mixture is then directed to a buffer chamber 80 where the vapor or partially vaporized droplets exiting the injection-atomization chamber are further vaporized by thermal radiation into a complete vapor or superheated vapor. The complete vapor and superheated fuel-$H_2O$ mixture leaves the buffer chamber to enter a heat exchanger 90 where the mixture is heated to a higher temperature in the range of 350-500° C. The preheated mixture then flows in a plasma reformer 100 where the hydrocarbon fuel and $H_2O$ are dissociated. The reformate stream (syngas) contains mainly hydrogen ($H_2$), carbon monoxide (CO), carbon dioxide ($CO_2$), and trace hydrocarbons such as $CH_4$, $C_2H_2$, $C_2H_4$. This syngas is quite hot and is directed to heat exchanger 90 to preheat the fuel-$H_2O$ mixture leaving buffer chamber 80. In the process shown in FIG. 1 the syngas exits the system 160 after leaving heat exchanger 90 and could be fed directly to hydrogen-fueled internal combustion engines, industrial boilers and furnaces, or residential and commercial heating means.

If the process is to be used to produce hydrogen with sufficient purity for use in a fuel cell, the flow diagram shown in FIG. 2 is applicable. The reformate stream leaving the plasma reformer is directed to a water shift reactor 110 to convert carbon monoxide and $H_2O$ to carbon dioxide and hydrogen. Steam in the reformate stream or steam added to it from an external source could be used to supply the $H_2O$ used in the water shift reactor. The CO-reduced reformate stream exiting from water shift reactor 110 is directed to heat exchanger 90 to further recover waste heat from reformer 100. Trace amounts of unconverted CO is optionally further removed by CO removal device 120 after exiting the heat exchanger and before entering hydrogen separator or purifier 130 from which a stream that is pure hydrogen exiting through pipe 140 and a stream with other gases, mainly carbon dioxide, exiting through pipe 150. The CO removal device can be a catalytic reactor, such as a preferred oxidation (PrOx) device.

The water shift reactor 110 may also be located between the heat exchanger and the CO removal device. In this case, the reformate stream from the plasma reformer enters into heat exchanger 90 and transfers heat to the stream entering the heat exchanger. This cooled reformate stream, after leaving the heat exchanger, enters water shift reactor 110 and then CO removal device 120. Several commercially available products, such as membranes and pressure swing adsorption (PSA) devices can be used as hydrogen separator, carbon monoxide removal, or purification devices. The CO-reduced reformate stream is then separated into two streams in the hydrogen purifier 130 as before. The plasma reformer and ancillary components can be built as a compact unit with fuel/$H_2O$ inlet pipes that fuel 50 and water 60 enter, and hydrogen/off-gas outlet pipes that hydrogen 140 and other gases 150 exit being its interfaces. It can be a stand-alone unit for hydrogen production or it can be integrated with a fuel cell stack for power generation.

Figure 3:
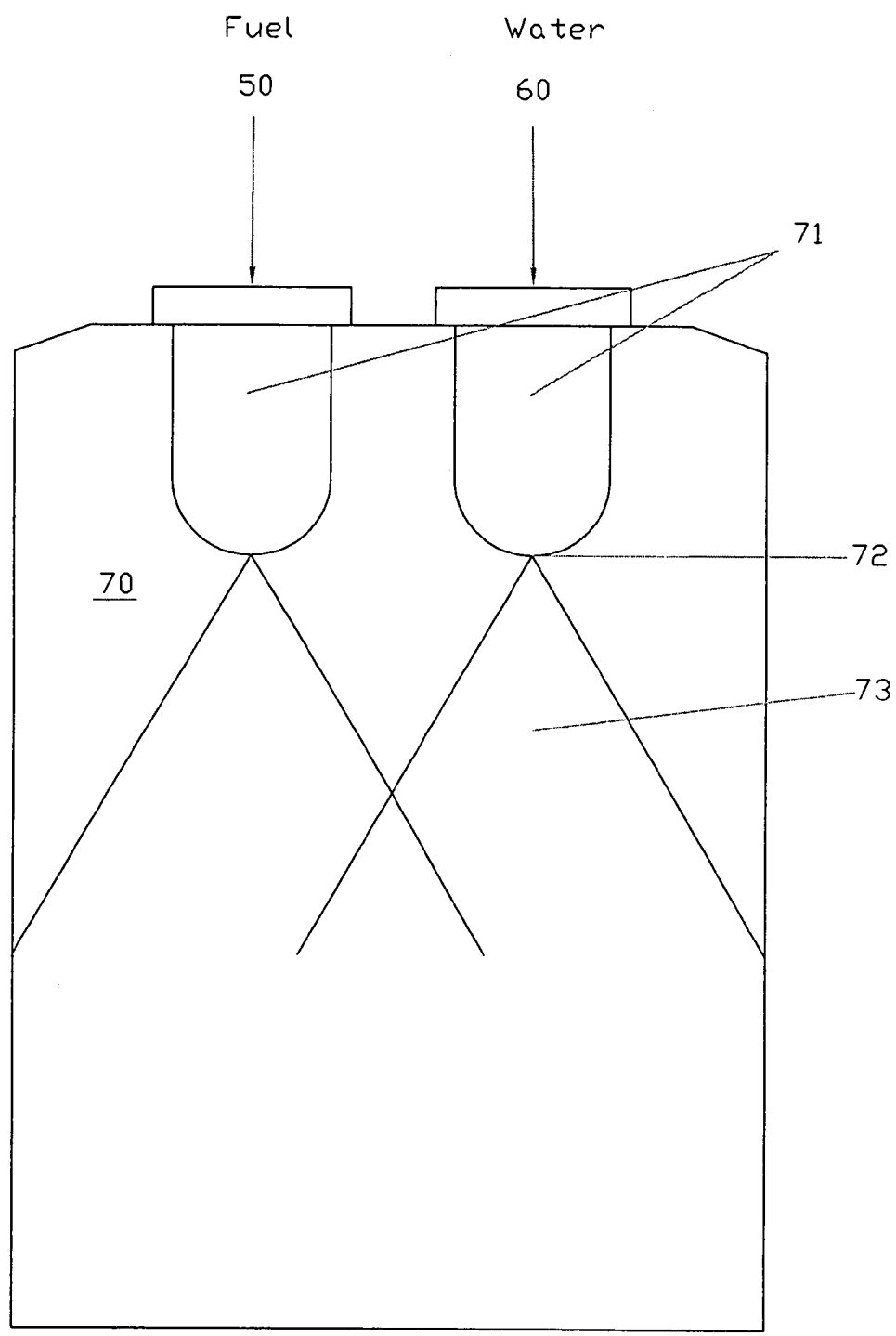
FIG. 3 shows a schematic of an injection-atomization chamber.

FIG. 3 is a schematic of the injection-atomization chamber 70. The figure shows two injection nozzles 71, one for liquid fuel 50 and the other for water 60, located on the top of the chamber. Trajectories of sprays 73 from those nozzle tips 72 intersect so that particle-to-particle interactions and uniform mixing are achieved and droplet-to-droplet agglomeration from different surface tension between hydrocarbon fuel and water are avoided. The atomized droplets are heated rapidly and vaporized almost instantaneously by thermal radiation. There is no internal heating means in the injection-atomization chamber; rather a heating source 81 (detailed in FIG. 4a) is supplied from buffer chamber 80 through thermal radiation. Because thermal radiation is transferred from the buffer chamber 80 to the injection-atomization chamber 70, for effective heating and energy exchange between atomized droplets and heating sources, the atomized droplets produced in the injection-atomization chamber 70 must be within the viewing angle (i.e, see or face the heating sources within the radiation configuration reviewing factor).

Figure 4A:
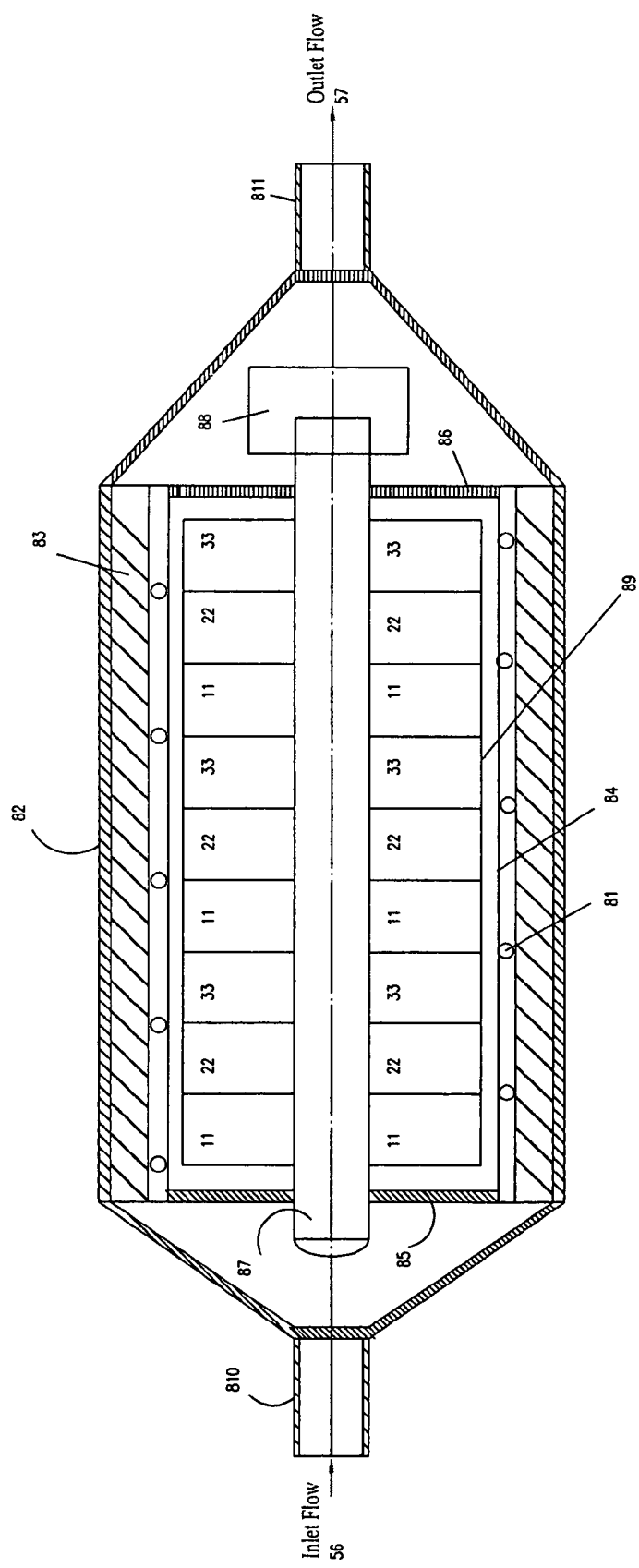
FIG. 4a shows a schematic of a buffer chamber.

FIG. 4a shows the major components of the integrated buffer chamber 80 includes an inlet pipe 810, an outlet pipe 811, rotor 87, rotor blades 89, a motor, 88, an internal wall 84, heating means 81 between the internal wall and a thermal insulation layer 83, and an outer stainless steel casing 82. The buffer chamber would also have a computer control device or an ECU (Electronic Control Unit) device. A mixture of atomized water and fuel 56 flows from the injection-atomization chamber 70 and enters the buffer chamber 80. The buffer chamber provides radiant heat to the injection-atomization chamber as well as to itself, and to provide means for turbulent mixing and for superheated (dry) gas. A good design of the buffer chamber is critical for (1) effective atomization and vaporization of droplets in the injection-atomization chamber by supplying radiant energy; (2) energy efficient in both chambers; (3) complete vaporization of fuel and water in the buffer chamber; (4) fast and effective mixing of fuel and water vapor in the buffer chamber; (5) elimination of hot spots and coke or carbon formation in downstream components, such as the plasma reformer; (6) fuel and $H_2O$ having enough resident time to produce a superheated gas stream in a compact and short flow-length device; and (7) preventing fouling and promotion of uniform flow distributions in downstream components. The buffer chamber is very important because prevention of fouling and promotion of uniform flow distributions enhances reliable starts after long periods of non-use as well as cold weather starts. To achieve these design objectives, the buffering internals located at the center of the chamber along the flow direction must be designed with surfaces that can see (within its view area) heat sources from the surrounding walls as well as see much of its fellow internal areas. For optimum thermal radiation transfer, the size, view angle, surface area, and other radiation properties are critical.

The rotor 87 is connected to the motor 88 which provides the driving force. However, this invention does not exclude a configuration of blades that are fixed without rotation. In this fixed-blades configuration the mixture flow is still rotating when it passes the zip-zap fixed blades. The rotor is supported by the inlet screen mesh 85 and outlet screen mesh 86. The inlet and outlet meshes not only provide structural support but also allow the inlet and outlet flows to pass through the buffer chamber. The buffering internals, (i.e rotor, rotor blades, and motor) are located along a central axis of the chamber along the direction of flow and an external heat source is 81 located at the internal wall surface that is facing the buffering internals. Electric heaters such as ceramic band heater or mica band heater are a preferred heating means. These heaters are clamped around the internal wall. The heat input is supplied by heating means 81 to the internal wall surfaces 84. The heat flux on the reactor wall surfaces will be transferred to the flow medium through convection and to the fin blades 89 through thermal radiation. The fin blade consists of three rotating patterns 11, 22, and 33 that are described in FIGS. 4b-4d in detail. The temperature and heat flux of the fin blades 89 are increased from thermal radiation from the reactor wall 84. In addition, the heating process of the fuel and $H_2O$ is enhanced from flow mixing and increased in heat transfer surface area created by the fin blade arrangement shown in FIG. 4b and the rotation of the fin blades. The combination of thermal radiation enhancement and rotating flow significantly promotes a uniform heating to the medium from all the reactor wall boundaries including rotor blade surfaces. The rotor blade design takes advantage of combining thermal radiation and convection heat transfer for uniform mixing and uniform heating. This uniformly mixing and uniformly heating mixture exits the outlet pipe 811 as an outlet flow 57 before entering the heat exchanger 90 and then plasma reformer 100.

Figure 4B:
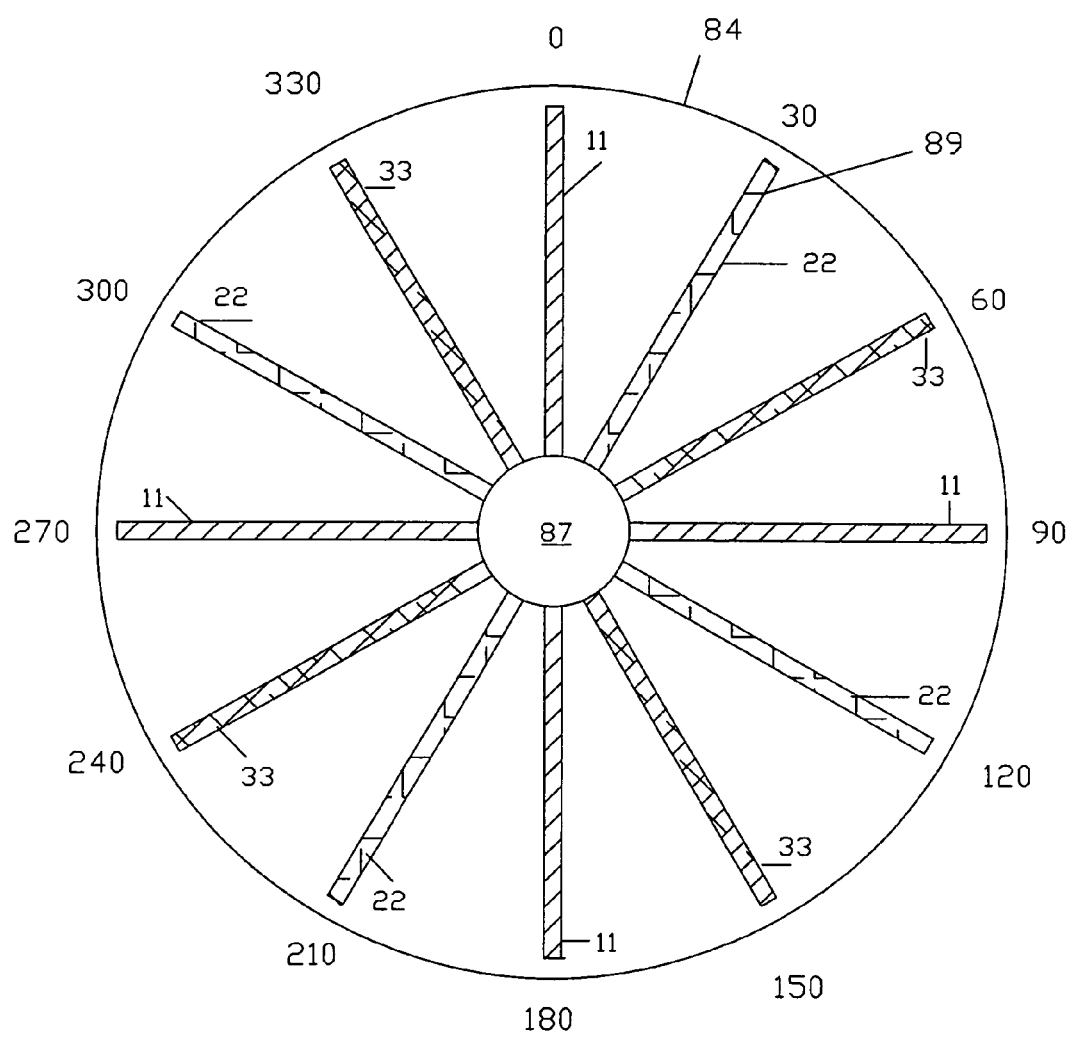
FIG. 4b shows a rotating blade type of buffering internals in the buffer chamber.
Figure 4C:
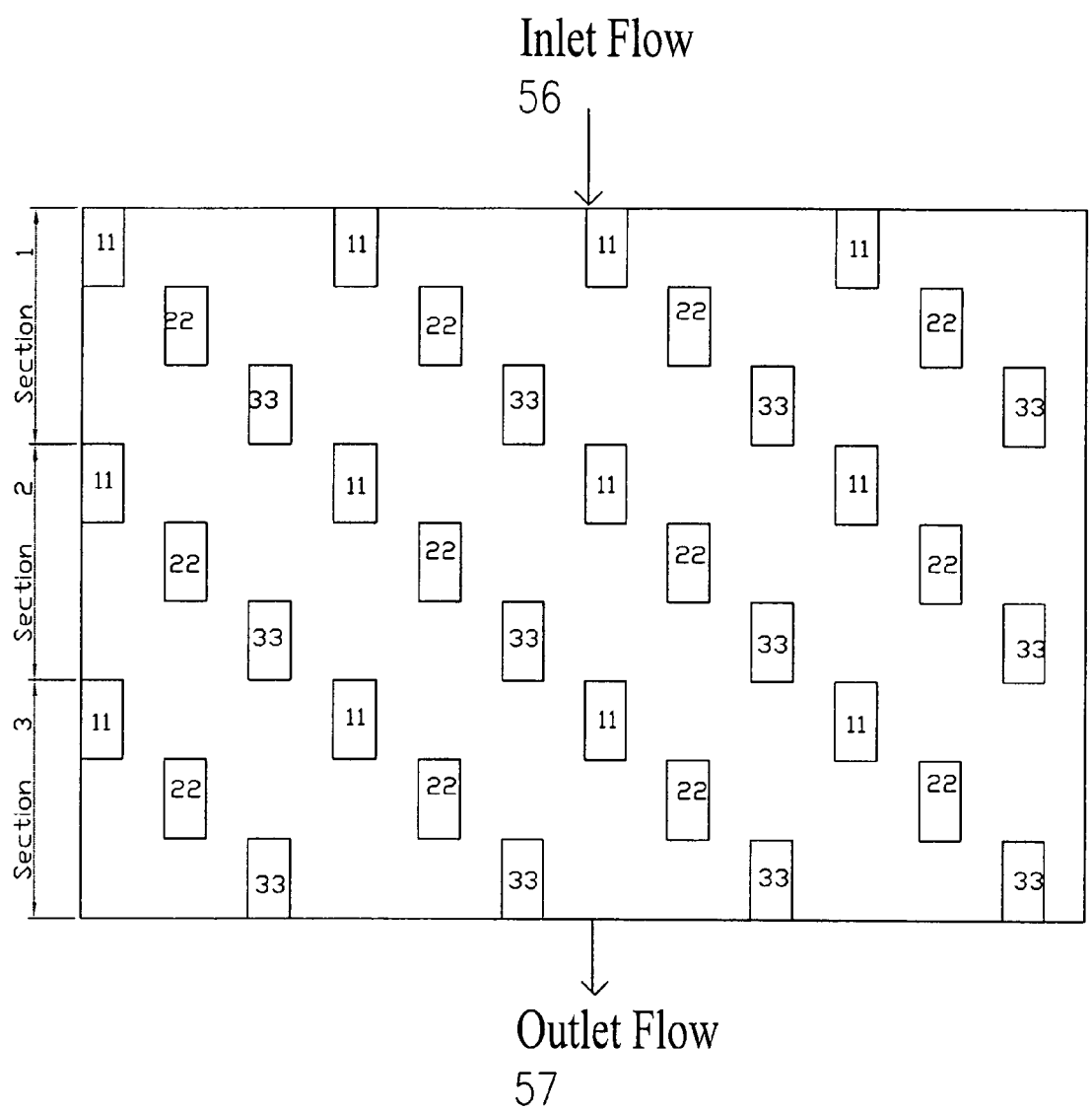
FIG. 4c shows a fin blade distribution on the envelope of the rotor
Figure 4D:
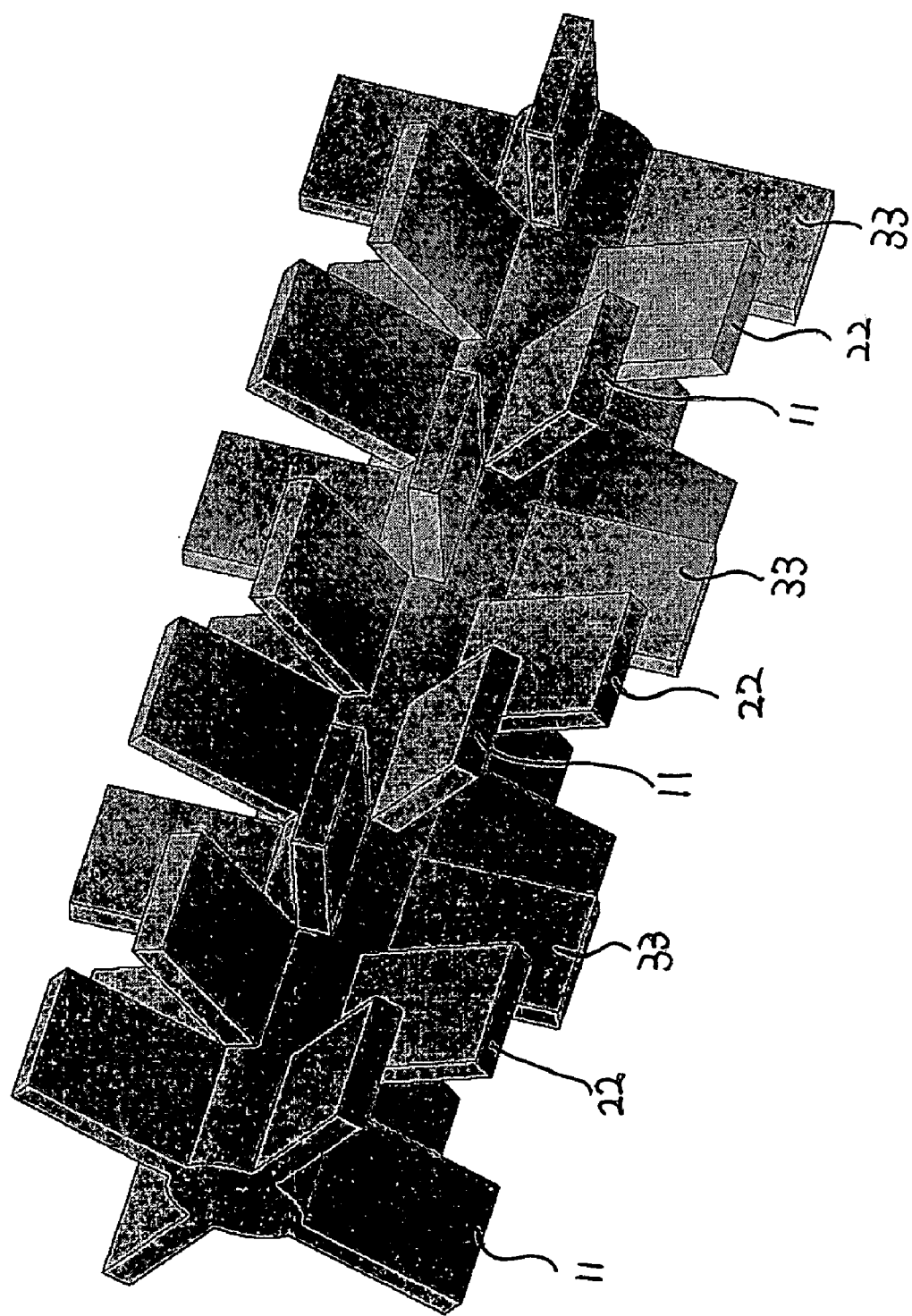
FIG. 4d shows a three-dimensional drawing of the fin blade patterns

A rotating blade design that combines thermal radiation and convection heat transfer for uniform mixing and heating, as shown in FIGS. 4b-4d is preferred. This invention does not require catalysts in the pre-reformer components. Therefore, a wide range of operational temperatures and fuel compositions (particularly sulfur and heavy aromatic contents) can be tolerated.

FIG. 4b shows an arrangement of fin blades consisting of three rotating patterns 11, 22, 33 with 30 degree offset angle. Each fin pattern has four blades. However, the fin patterns are not be limited by three and the offset angle is not limited by 30 degree. Other combinations of fin patterns, blades per pattern, and offset angles can achieve the objectives of achieving uniform mixing and uniform heating. This three-pattern configuration can be repeated for many times depending on the heating or temperature requirements. The cross-section of the buffer chamber 80 includes the rotor 87, blades 89, fin blade patterns 11, 22 and 33, and internal wall 84. The locations of the blades 89 and its fin blade patterns are arranged with 30 degree offset angle in a clockwise fashion at 0, 30, 60, 90, 120, 150, 180, 210, 240, 270, 300, 330, 360 (or 0) degree angles.

FIG. 4c shows the fin blade distribution on the envelope of the rotor. The three rotating patterns with 30 degree offset angles are shown in three repeated sections. The inlet flow 56 enters from the top and the outlet flow 57 exits to the bottom of the figure. This invented fin blade distribution will significantly promote the effective mixing and increase the convective heat transfer coefficient in the zip-zap flow among the fin blades. FIG. 4d shows a three-dimensional drawing of the blade 89 with three fin blade patterns 11, 22, and 33. Rotating mixture flow with convective and radiant heat transfer can also be achieved in a buffer chamber with fixed, or non-rotating blades.

Figure 5:
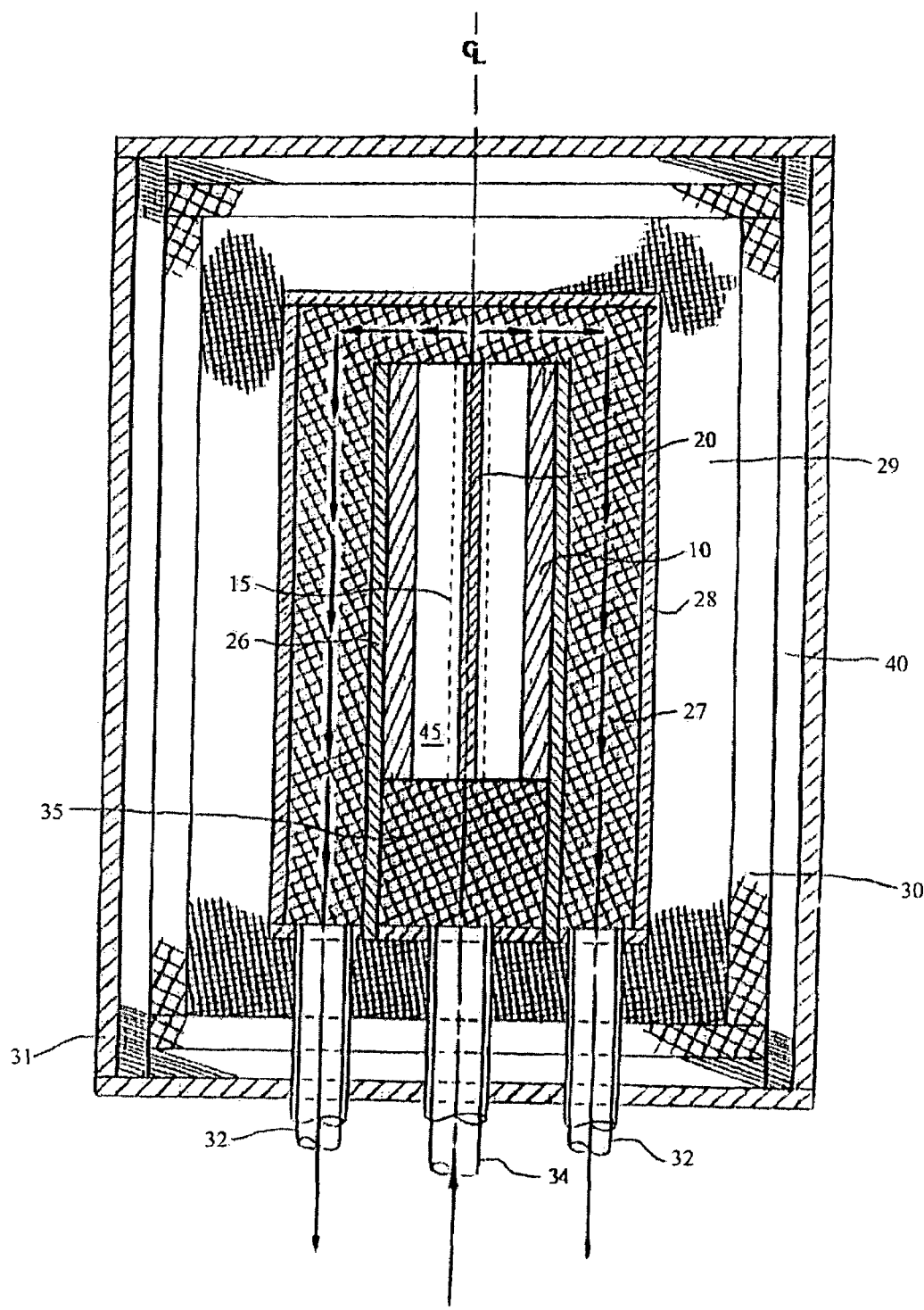
FIG. 5 shows an elevation of a plasma reformer.

The heart of the invention is producing hydrogen from reforming $H_2O$ and a hydrocarbon fuel in the plasma reformer. FIG. 5 shows an elevation view of a plasma reformer. The plasma reformer, has an inlet 34 to admit the preheating gaseous mixture of $H_2O$ and hydrocarbon fuel into the plasma reformer. This mixture is further heated and mixed in turbulent heating zone 35. The mixture then enters reaction chamber 45. The $H_2O$ in the mixture that enters the reaction chamber is in the form of superheated steam. The reaction chamber contains one or more emitter electrodes 10 and one or more collector electrodes 20. Each emitter electrode—collector electrode pair forms an electric circuit and is at high temperature by being heated by an external source of electricity. The electrical energy produces active energetic electrons ($_{hard}e^-$), and maintains and controls optimal plasma conditions. These hard electrons produce excited species ions, free radicals, and additional lower energy electrons ($_{soft}e^-$) through electron-impaction or electron-expelling dissociation, excitation, and ionization of hydrocarbon molecules. When multiple electrodes are used there could be in circuits using different external sources of electricity, such as 110 volt AC, 220 volt AC or DC. The emitter electrodes 10 are embedded in the outer lateral walls of the reaction chamber. The collector electrodes 20, which can be single or multiple, form or are embedded in the inner lateral wall of the reaction chamber, which surrounds the center line $^C_L$ of the reformer. It is preferred that a filter 15, which could be made of a semiconductor, such as silicon-based zirconium oxide, or a ceramic alloy such as alumina, surrounds the collector electrodes. The filter acts to neutralize ions and to allow passing of electrons to the collector electrode(s) while slowing them down so that they impart less kinetic energy (heat) to the collector electrodes. The filter also acts as a thermal radiation shield to cool the collector electrode(s) to improve their effectiveness. The hot emitter electrodes emit active high-energy electrons ($_{hard}e^-$) that may be absorbed by hydrocarbon molecules in the reaction chamber or may expel orbital electrons from the hydrocarbon molecules if the energy transferred to the molecule exceeds the ionization potential of the molecule. When an orbital electron is expelled, the molecule becomes ionized and the incident or expelled electron loses energy and becomes a lower energy or soft electron ($_{soft}e^-$). The energy-degraded incident electron and the expelled electrons are soft electrons. More than one orbital electron can be expelled as shown in Eq. 1, where M represents a molecule

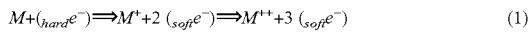 (1)

Figure 6:
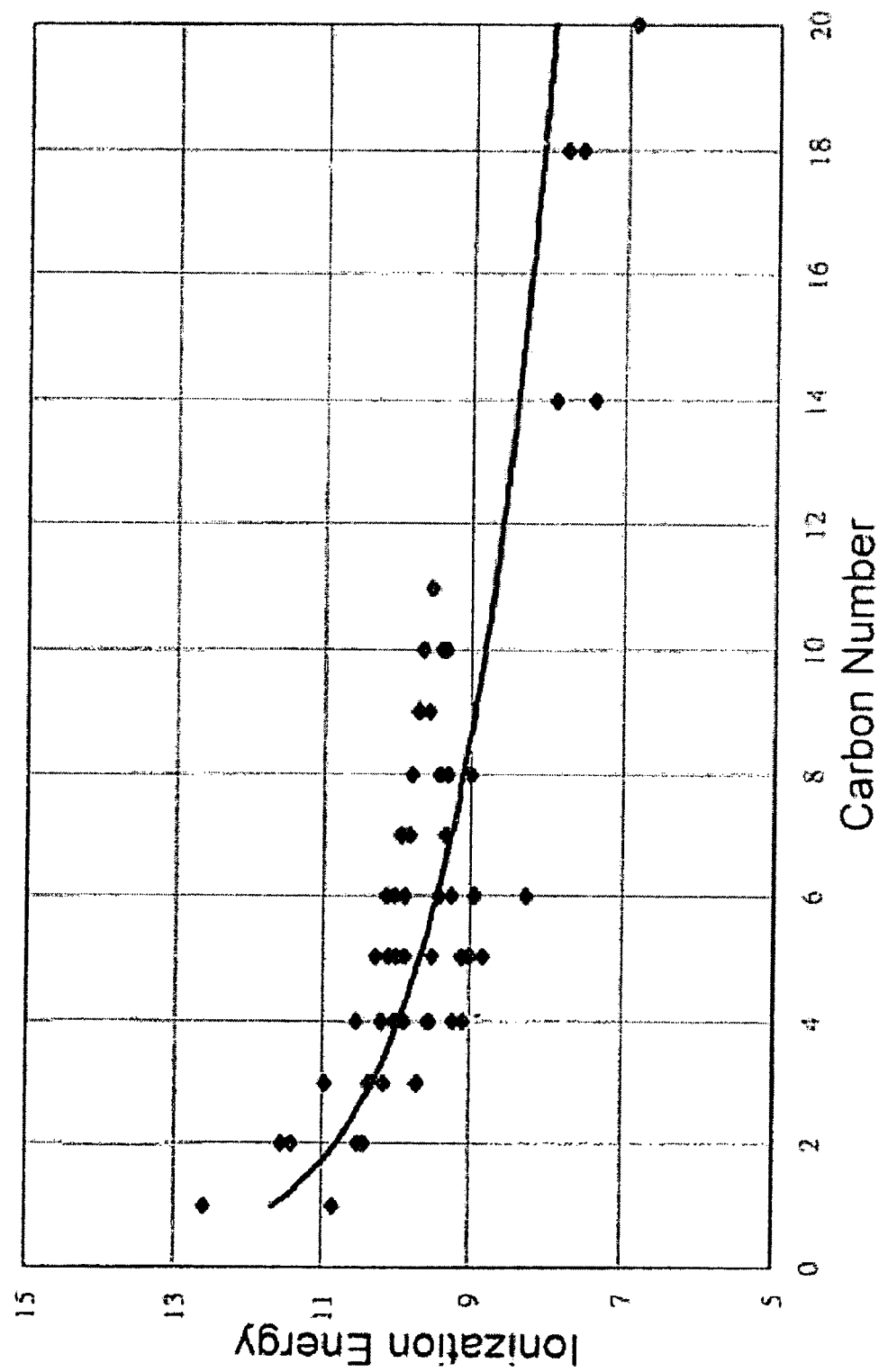
FIG. 6 is a graph of ionization potential of various hydrocarbons as a function of carbon number.

$H_2O$ has a high ionization potential (12.6 eV) and is a small molecule that presents a small target for hard electrons. Hydrocarbons are larger molecules and those that have a lower ionization potential than water are more readily ionized by hard electrons. FIG. 6 shows that the ionization potential of hydrocarbon decreases as the number of carbon atoms in the molecule, the carbon number, increases. Ionization originates with ionization of hydrocarbons near the surface of the emitter electrodes 10. These red-hot electrodes also originate an electricity-conducting gas medium that propagates from the emitter electrodes to the collector electrode 20. The hydrocarbon fuel in addition to being dissociated itself, by being initially ionized initiates plasma conditions that have a field of soft electrons. The soft electrons thus produced readily interact with and are absorbed by the superheated $H_2O$ stream molecules that are energetic at the high temperatures in the reaction chamber. Soft electrons with energies about 5 eV to 6 eV are optimum for dissociating $H_2O$, into hydrogen and oxygen through electron impaction or absorption. Hard electrons with energy above 7 eV and ions play key roles in dissociating and ionizing hydrocarbon fuels. For hydrogen production, the preferred temperature range in the chamber is 700° C. to 1000° C., although the temperature could range from 400° C. upwards to 1900° C. As shown in Eq. 2, steam interacts with soft electrons to form ionized $H_2O$, or hydro-radicals, which dissociates into hydrogen and oxygen. The oxygen thus produced reacts with carbon from dissociation of the hydrocarbon fuel to form carbon oxides, $CO_x$, instead of forming carbon or coke.

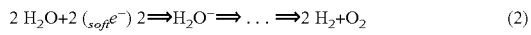 (2)

Figure 7:
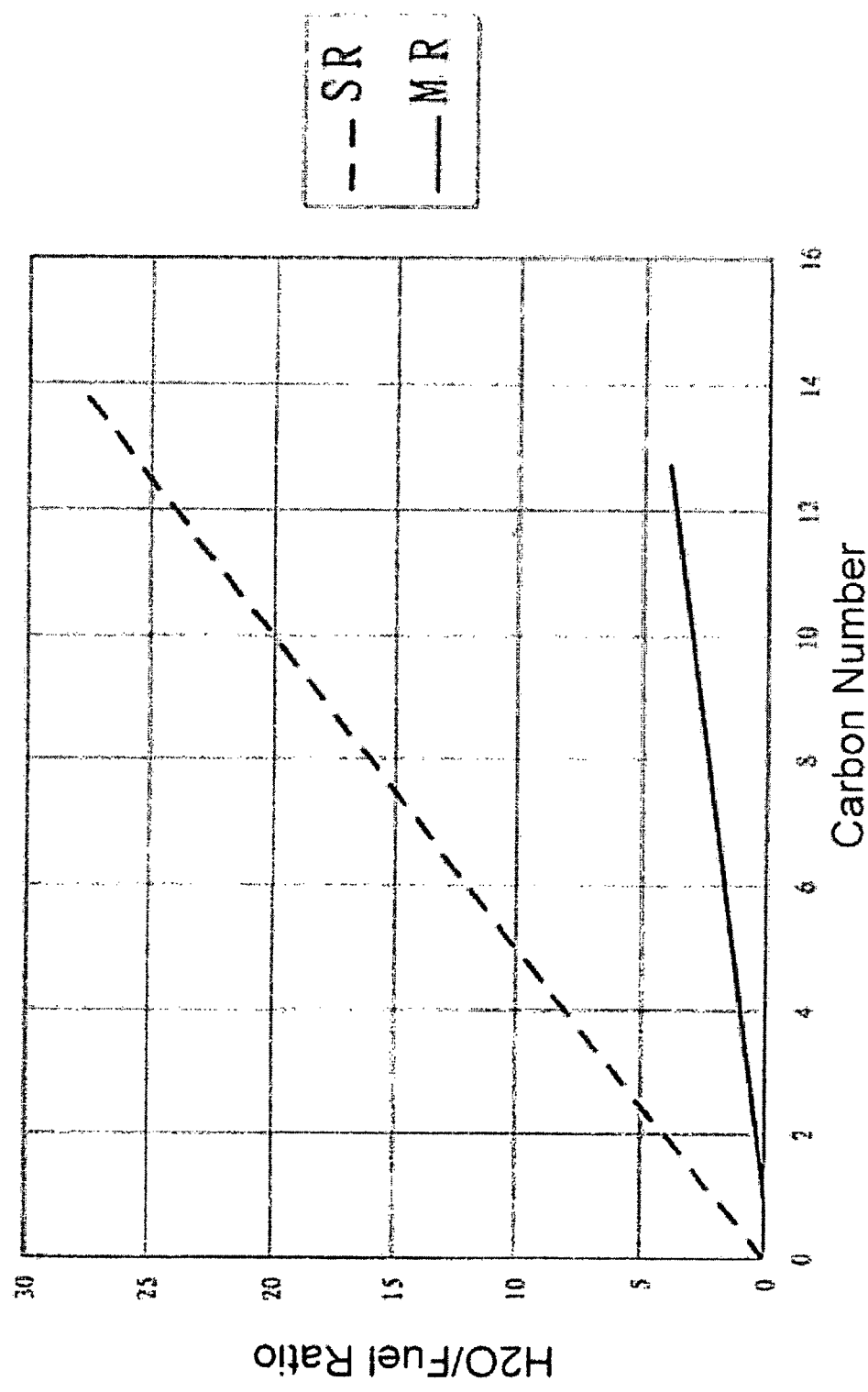
FIG. 7 is a graph of water/fuel ratio as a function of hydrocarbon carbon number.

FIG. 7 plots the ratio of $H_2O$ mole to hydrocarbon fuel moles as a function of carbon number to obtain complete reactions. The figure shows that the $H_2O$/fuel ratio is a linear function of carbon number. The solid line was obtained from preliminary demonstration tests performed by the inventor in which the ratio of $H_2O$/fuel was arbitrarily limited. The dotted line represents the theoretical stoichiometric ratio. The figure also shows scattered point data reported in the literature. With careful selection of electrode material, and optimized reactor design and operational conditions, the value of $H_2O$/fuel moles can be pushed above the stochiometric ratio line. This means that the majority of hydrogen produced by this process is produced from $H_2O$, with hydrocarbon fuel acting as only an initiator, agent, or promoter.

For the plasma reformer to perform well the emitter electrodes should be made of a suitable emitter material. Emitter electrodes should be capable of (1) supplying heat to maintain high temperatures in the reaction chamber of the plasma reformer; and (2) emitting electrons from their surfaces. The properties of good emitter materials are: a high electron emission capability; (2) low rate of deterioration; (3) low emissivity to reduce thermal radiation of the emitters; and (4) no reactions with the hydrocarbon fuel and the surrounding walls, including the collector electrodes. Transitional metals, such as tungsten, titanium, chromium, niobium, zirconium, and molybdenum have these properties. The collector electrode material should be a transitional metal with a low work function. The lower the work function, the less energy electron give up entering the collector surface. Preferred collector materials include tungsten, zirconium, titanium, and molybdenum. The number, shape, and orientation of electrodes are also important. It is preferred that emitter electrode surfaces have needle-type extrusions (with a diameter from 1-2 nanometers to 100 micrometers) to enhance electron emission. Such needle-type extrusions can be growth with special design and treatment, such as acidic etching. A high electron emission rate will result in a high population of electrons in the reaction chamber and will increase the probability of ionization of the hydrocarbon fuel and dissociation of $H_2O$.

To maintain the high temperature range that is required in reaction chamber 45, the plasma reformer should surround it with layers of insulation. A preferred embodiment, as shown in FIG. 5 of the plasma reformer should have the following structure. Proceeding from the outside of the reformer inward there is steel casing 31, compression-expansion cushion mat 40, insulating high-temperature fiber blankets 30, high temperature vacuum form fibers 29, a ceramic outer wall 28, an energy retaining zone 27, a ceramic inner wall 26, and turbulent heating zone 35 and reaction chamber 45. Vacuum form fibers are formed with higher density and a higher percentage of higher melting/boiling point ceramic materials than fiber blankets.

I claim:

1. A process for producing hydrogen from dissociating $H_2O$ and hydrocarbon fuels comprising:
    mixing, atomizing, and vaporizing $H_2O$ and hydrocarbon fuel;
    heating the vaporized $H_2O$ and hydrocarbon fuel mixture in a heat exchanger;
    passing the vaporized $H_2O$ and hydrocarbon fuel mixture to a plasma reformer, dissociating $H_2O$ and hydrocarbon fuel, and forming a reformate stream containing hydrogen, carbon monoxide, carbon dioxide, and trace hydrocarbons in a reaction chamber of the plasma reformer in an intense electron field between emitting electrodes and collecting electrodes at a temperature in the chamber of between 400° C. and 1900° C.;
    converting carbon monoxide in the reformate stream and added $H_2O$ to hydrogen and carbon dioxide in a water shift reactor; and
    cooling the reformate stream from the water shift reactor in the heat exchanger and heating the vaporized $H_2O$ and hydrocarbon fuel mixture entering the heat exchanger.

2. The process for producing hydrogen as set forth in claim 1 wherein dissociating the vaporized $H_2O$ and forming a reformate stream occurs in the reaction chamber of the plasma reformer at a temperature between 700° C. and 1000° C.

3. The process for producing hydrogen as set forth in claim 1 further comprising separating the cooled reformate stream from the heat exchanger into a pure hydrogen stream and a stream containing other constituents of the reformate stream.

4. The process for producing hydrogen as set forth in claim 2 further comprising separating the cooled reformate stream from the heat exchanger into a pure hydrogen stream and a stream containing other constituents of the reformate stream.

5. The process for producing hydrogen as set forth in claim 3 further comprising removing carbon dioxide from the cooled reformate stream from the heat exchanger prior to separating into the hydrogen stream and the stream containing other constituents of the reformate stream.

6. The process for producing hydrogen as set forth in claim 4 further comprising removing carbon dioxide from the cooled reformate stream from the heat exchanger prior to separating into the hydrogen stream and the stream containing other constituents of the reformate stream.

7. The process for producing hydrogen as set forth in claim 2 wherein mixing, atomizing, and vaporizing $H_2O$ and hydrocarbon fuel is accomplished by radiant heating in an injection-atomization chamber and in a buffer chamber with rotating mixture flow and convective heat transfer.

8. The process for producing hydrogen as set forth in claim 4 wherein mixing, atomizing, and vaporizing $H_2O$ and hydrocarbon fuel is accomplished by radiant heating in an injection-atomization chamber and in a rotating blade buffer chamber with rotating mixture flow and convective heat transfer.

9. The process for producing hydrogen as set forth in claim 5 wherein mixing, atomizing, and vaporizing $H_2O$ and hydrocarbon fuel is accomplished by radiant heating in an injection-atomization chamber and in a non-rotating blade buffer chamber with rotating mixture flow and convective and radiant heat transfer.

10. A process for producing hydrogen from dissociating $H_2O$ and hydrocarbon fuels comprising:
   mixing, atomizing, and vaporizing $H_2O$ and hydrocarbon fuel mixture by radiant heating in an injection-atomization chamber and in a buffer chamber with rotating mixture flow and convective and radiant heat transfer;
   heating the vaporized $H_2O$ and hydrocarbon fuel mixture in a heat exchanger;
   passing the vaporized $H_2O$ and hydrocarbon fuel mixture to a plasma reformer, dissociating $H_2O$ and hydrocarbon fuel, and forming a reformate stream containing hydrogen, carbon monoxide, carbon dioxide, and trace hydrocarbons in a reaction chamber of the plasma reformer in an intense electron field between emitting electrodes and collecting electrodes at a temperature in the chamber of between 400° C. and 1900° C.;
   cooling the reformate stream from the reformer in the heat exchanger and heating the vaporized $H_2O$ and hydrocarbon fuel mixture entering the heat exchanger;
   converting carbon monoxide in the cooled reformate stream from the heat exchanger and added $H_2O$ to hydrogen and carbon dioxide in a water shift reactor; and
   separating the cooled reformate stream from the water shift reactor into a pure hydrogen stream and a stream containing other constituents of the reformate stream.

11. The process for producing hydrogen as set forth in claim 10 wherein dissociating the vaporized $H_2O$ and forming a reformate stream occurs in the reaction chamber of the plasma reformer at a temperature between 700° C. and 1000° C.

12. The process for producing hydrogen as set forth in claim 11 further comprising removing carbon dioxide from the cooled reformate stream from the water shift reactor prior to separating into the hydrogen stream and the stream containing other constituents of the reformate stream.

* * * * *